US008671057B1

(12) United States Patent
Zuili

(10) Patent No.: US 8,671,057 B1
(45) Date of Patent: Mar. 11, 2014

(54) METHOD AND SYSTEM TO DETECT INVALID AND FRAUDULENT IMPRESSIONS AND CLICKS IN WEB-BASED ADVERTISEMENT SCHEMES

(75) Inventor: Patrick Zuili, Boca Raton, FL (US)

(73) Assignee: Britesmart Corp., Boca Raton, FL (US)

( * ) Notice: Subject to any disclaimer, the term of this patent is extended or adjusted under 35 U.S.C. 154(b) by 1111 days.

(21) Appl. No.: 12/654,616

(22) Filed: Dec. 24, 2009

Related U.S. Application Data

(60) Division of application No. 11/781,716, filed on Jul. 23, 2007, now Pat. No. 7,953,667, which is a continuation-in-part of application No. 10/360,688, filed on Feb. 7, 2003, now Pat. No. 7,249,104.

(51) Int. Cl.
*G06F 21/00* (2013.01)
*G06Q 20/00* (2012.01)

(52) U.S. Cl.
USPC .......................................................... 705/50

(58) Field of Classification Search
USPC .............. 705/50, 16, 21, 59, 71; 380/44, 262, 380/278, 279
See application file for complete search history.

(56) References Cited

U.S. PATENT DOCUMENTS

| 6,452,609 B1 * | 9/2002 | Katinsky et al. ............... 715/716 |
| 2003/0233482 A1 * | 12/2003 | Skrepetos ..................... 709/250 |

* cited by examiner

*Primary Examiner* — Dante Ravetti
(74) *Attorney, Agent, or Firm* — John R. Kasha; Kelly L. Kasha; Kasha Law LLC

(57) ABSTRACT

This invention is related to web-traffic and used in online advertising including interactive TV, cellular telephone or Personal Digital Assistant PDA. It discloses a system to detect invalid and fraudulent impressions and clicks and method of pay-per-click (when advertisers pay upon users actually clicking) and pay-per-impression (when advertisers pay based on number of views) advertising arrangements, which periodically generates a code associated with the search-engine users. This code, preferably in the form of a serial number, is compared to the user of the website, such that by observing a metric like the number of clicks for a given period of time, be it a short time or a longer period, such as a day or a week, the system can automatically determine if certain clicks are illegitimate. This allows the search engine company to fairly invoice the merchants, thereby preventing fraudulent over use.

12 Claims, 2 Drawing Sheets

METHOD AND SYSTEM TO DETECT INVALID AND FRAUDULENT IMPRESSIONS AND CLICKS IN WEB-BASED ADVERTISEMENT SCHEMES

CROSS REFERENCE TO RELATED APPLICATION

This application is a divisional application of U.S. patent application Ser. No. 11/781,715, filed Jul. 23, 2007, which is a continuation in part of U.S. patent application Ser. No. 10/360,688, filed Feb. 7, 2003, U.S. Pat. No. 7,249,104.

FIELD OF THE INVENTION

This invention relates generally to network computing of the type which occurs over the Internet and World Wide Web, for example, and, more particularly, to a method of protecting the providers of pay-per-click services from multiple illegitimate usages.

BACKGROUND OF THE INVENTION

Over the last few years in particular, the capabilities of the Internet have grown dramatically, with the introduction of new protocols (i.e., XML), advanced browsers, electronic commerce capabilities, and other features.

Numerous commercial enterprises are now attempting to somehow profit through this new infrastructure, in many cases by providing services that attach a smaller incremental monetary value to a particular transaction.

One such type of capability is the pay-per-click (sometimes including pay-per-impression) search engine popularized by Google Inc. and other companies. In accordance with such a capability, a user goes to a search engine, and inputs the name of goods or services as keywords that they would like the search engine to find. Various providers of goods and services register their websites with the search engine and these are provided to the user in a list which is prioritized by the level of compensation which the merchant will give the pay-per-click or pay-per-impression company if the user is routed to their site. For example, using such a system, if a user types in the keyword "binoculars," the pay-per-click or pay-per-impression system might return five potential links or banners, with the most prominent one being associated with that supplier of binoculars which will compensate for a penny or a few cents more than the links/banners presented below.

One problem with existing systems, is that a user may cause an undesirable level of expenditure on the part of the merchant by over-clicking on a particular link. In some cases, it has been known that some users have done this simply for the purpose of undermining a particular provider or competitor. Since the existing systems have no way of knowing whether a link through is legitimate or bogus, the provider of the goods/services winds up having to pay the pay-per-click provider excess sums, with the fraudulent perpetrator remaining un-reprimanded. Similarly in pay-per-impression systems, the fraudster would just keep searching for the same keyword so as to have many unnecessary impressions. These fraudulent impressions could adversely impact the competitor's finances.

Search has revealed the following related art.

U.S. patent application Ser. No. 11/244,467 ("Pay-per-click Fraud Protection"): The method described in this application is different because it does not disclose the generation of two codes on the server side and the concatenation of those codes as recited in the main claim of the present invention. In fact, the method in 11/244,467 differs from the present invention because it relies on computing probabilities of occurrences of click events.

U.S. patent application Ser. No. 11/234,476 ("Click fraud resistant learning of click through rate"): Although this application talks about computing click through rate, the method employed is different and it does not involve the generation of two codes on the server side and the concatenation of those codes as recited in the main claim of the present invention.

U.S. Pat. No. 7,043,471: Although this patent mentions click fraud detection, it does not explain how click fraud is detected. Therefore, it does not disclose many elements of the main claim of the present invention, including the generation of two codes on the server side and the concatenation of those codes.

U.S. Pat. No. 7,020,622 and PCT International Publication Number WO 02/091225 A3: Each of these publications disclose the tracking of user activity on the Web including interactions with Web pages and click-through navigation to select Web sites where purchases can be executed. It does not disclose the generation of two codes on the server side and the concatenation of those codes as recited in the main claim of the present invention. Indeed, each of the systems of these prior art publications does not apply to the same context as that of the present invention. Both these prior arts apply to a clearing-house and affiliate network. The relation between the clearing-house and the affiliates allow users' activities to be tracked. In contrast, the present invention applies to a search engine and the web sites of advertisers. In that context, the search engine cannot track the activities of users while they access the advertisers' web sites.

V. Anupam, A. Mayer, K. Nissim, B. Pinkas, and M. Reiter, On the Security of Pay-Per-Click and Other Web Advertising Schemes. In Proceedings of the $8^{th}$ International Conference on World Wide Web, pages 1091-1100, 1999: This paper describes the detection and prevention of an attack on a pay-per-click network using a referrer and JavaScript. It does not, however, disclose the generation of two codes on a server and the concatenation of those codes as recited in the main claim of the present invention.

C. Blundo and S. Cimato, SAWM: A Tool for Secure and Authenticated Web Metering. In Proceedings of the 14th ACM SEKE International Conference on Software Engineering and Knowledge Engineering, pages 641-648, 2002: Although this paper relates to click fraud detection, it does not disclose the generation of two codes on a server and the concatenation of those codes as recited in the main claim of the present invention. Rather, it uses a system involving encryption with a secret key and a plug-in that executes on the client side.

Jakobsson, P. MacKenzie, and J. Stern. Secure and Lightweight Advertising on the Web. In Proceedings of the 8th International Conference on World Wide Web, pages 1101-1109, 1999: This paper does not disclose the generation of a second code and the concatenation to a previously generated code as recited in the main claim of the present invention. Rather, it discloses the use of electronic coupons.

SUMMARY OF THE INVENTION

This invention describes pay-per-click and pay-per-impression arrangements periodically generating a code associated with the search-engine users. This code, preferably in the form of a number which could be encrypted or in clear, is compared to the user of the website, such that by observing a metric like the number of clicks for a given period of time, be it a short time or a longer period, such as a day or a week, the system can automatically determine if certain clicks are illegitimate. This allows the pay-per-click company to fairly invoice the merchants, thereby preventing fraudulent over use, and also identify which networks the fraudulent users use.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one", and the word "plurality" means one or more, unless otherwise mentioned.

DETAILED DESCRIPTION OF THE INVENTION

Figure 1:
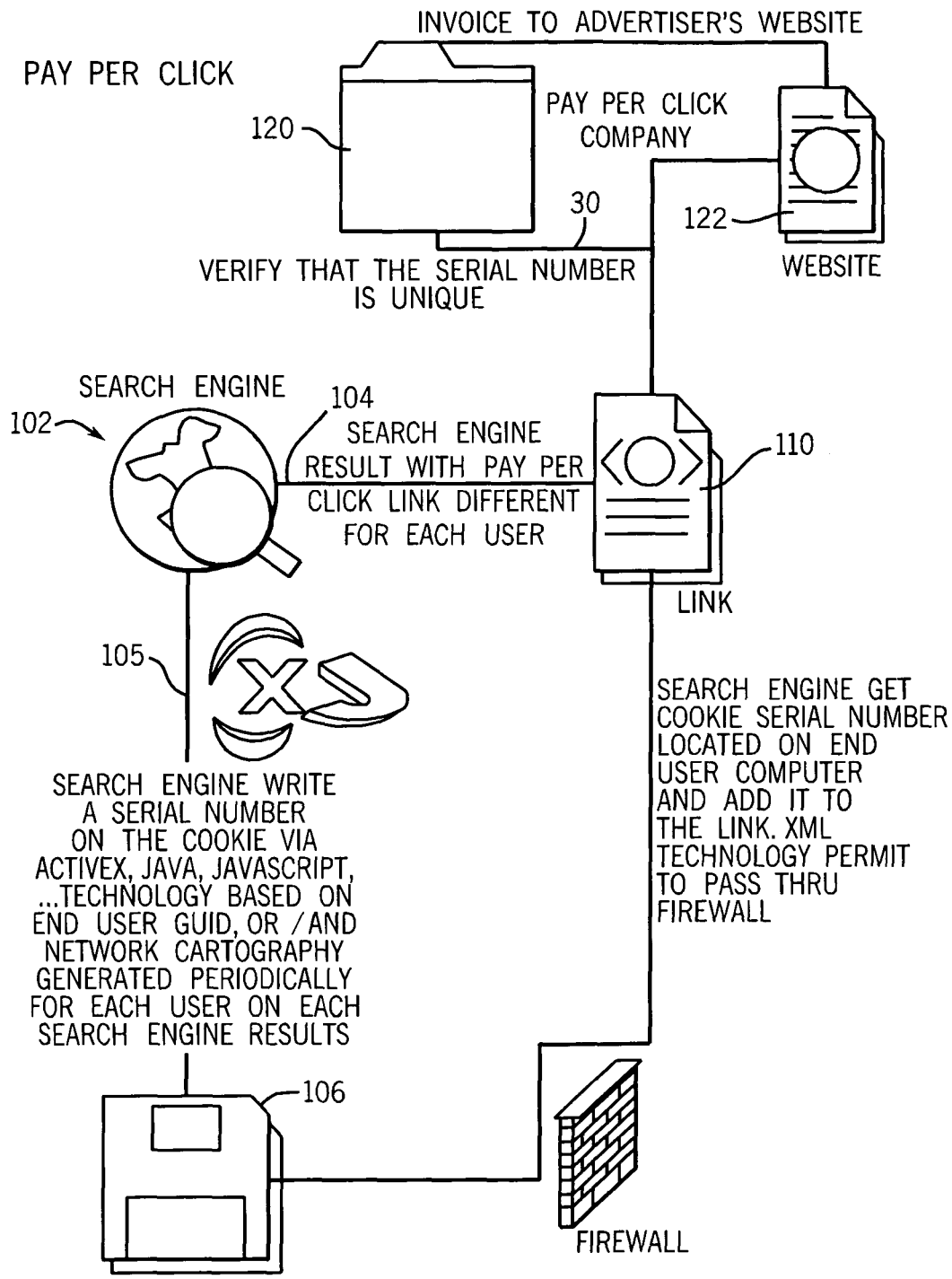
FIG. 1 is a diagram which illustrates a per-per-click system incorporating a preferred embodiment of the present invention.

Reference is made to FIG. 1 which illustrates a typical configuration associated with a pay-per-click implementation. It is noted that although the diagram includes certain interconnected graphical blocks, these are not taken to mean "hardware" or "software," but may include any combination of hardware/software necessary to implement a particular function. In addition, although lines are drawn between the various components, this is not meant to imply that they are necessarily implemented in close proximity to one another, since in many cases these capabilities will be remote.

The search engine 102 provides a result along path 104 which is indicative of a link associated with different users. Engine 102 may be any existing or yet-to-be-developed system, including Findwhat.com, Google's Adwords, Yahoo, Looksmart, Kanoodle, Msn, Ask.com, and so forth.

In addition to the result generated along path 104, according to this invention, the search engine generates a code, preferably in the form of a number, utilizing a cookie. The number could be a serial number, a globally unique identifier (GUID) or a pseudo-random number. This number could be generated using an algorithm like a pseudo-random number generator, a GUID generator, an encoding technique like base64 and an encryption algorithm.

The code could be stored via ActiveX, Java, JavaScript, browser toolbar, or any other type of technology based within the end-user graphical user interface device (for example, a web browser like Microsoft Internet Explorer). For example, the browser toolbar can intercept the click made on a link and make appropriate modifications to the request being made to the search engine. The toolbar can use technologies like ActiveX and JavaScript. Such toolbars already exist for browsers like Internet Explorer. Also, toolbars could be of various types like P2P toolbar, remote-controlled toolbar and P2P centralized toolbar. The modifications to the code could include adding timestamp, identity information like MAC address of the device, other MAC addresses in the subnet of the device or any changes made to the MAC addresses.

In addition, or as an alternative, network cartography may be generated periodically for each user based upon their use of the search engine 102. The network cartography could include the user device's IP and MAC address or the network route information between the device and the pay-per-click system. Network cartography is a general term that describes the output of three sets of commands: trace route, ping and reverse DNS. Network cartography provides information about the nature of the network such as routers' location and speed of the packets to travel the path.

Figure 2:
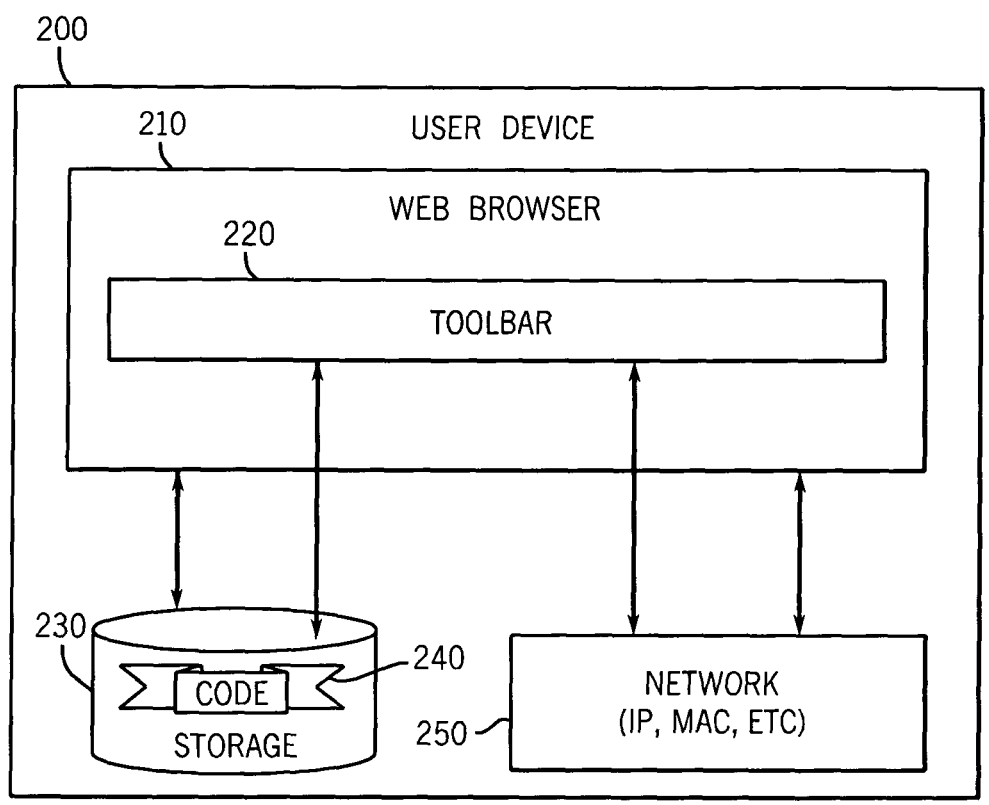
FIG. 2 is a diagram which illustrates the various components of a user device that interacts with the search engine.

FIG. 2 illustrates various components in a user device 200. The user device 200 could be a user desktop, laptop, PDA, smart phone, phone with Internet capabilities, interactive TV or other devices capable of connecting to the Internet. In one of the embodiments the user device 200 contains a web browser 210 that is capable of connecting and browsing websites and search engines. Example of a web browser is Microsoft Internet Explorer. The web browser 210 can contain a toolbar 220 that can add to the functionality of the browser. For example, the toolbar 220 can provide direct interface to a search engine whereby the searches could be performed directly. The toolbar 220 can also intercept any request made by the browser and perform additional processing on the request. The user device 200 also comprises of storage 230 and a network 250. The storage 230 could be used by the browser 210 and toolbar 220 to store code 240.

When the user clicks on a link within the browser 210, the code 240 with information like network cartography, timestamps and number of previous clicks, will be sent to the search engine 102 and will be interpreted by the pay-per-click system 120 to determine various parameters like the frequency of clicks from that user or device, interval between clicks etc. These parameters can be layered on top of each other with each layer forming a separate fraud discovery criteria and hence could be used to determine the fraudulent clicks. Information about users, devices and fraudulent clicks could be shared with the merchants and also published in a public or private directory of fraudsters. The actual billing to the merchants would be done by consideration of all these parameters by both the parties.

This method is also effective in identifying competitor fraud, where merchants employ humans or machines to cause unnecessary clicks or impressions on a competitor's link, thus resulting in excessive billing. Using the method described previously, the code could be installed within a merchant's computing environment by the pay-per-click system. This code could then be used to determine if that merchant is doing fraud with another merchant by identifying network, MAC addresses, and subnet mapping. The code could also be allowed to make appropriate checks during the logon process of the merchant's back-office device.

Although the encoded number is shown being written to a floppy disk 106, again, it will be appreciated by those of skilled in the art that any type of storage capability, such as a flash memory, cached memory, a hard disk, a compact disc (CD), a digital versatile disc (DVD) and so forth may alternatively be utilized. The number generated by the search engine along path 105 is concatenated with the result along path 104 through XML link 110 or regular HTTP link using port 80. Given the number provided through the cookie, this allows the concatenation to occur through firewalls and other devices which may otherwise block the transmission as unauthorized.

While the foregoing is directed to embodiments of the present invention, other and further embodiments of the invention may be devised without departing from the basic scope thereof, and the scope thereof is determined by the claims that follow.

What is claimed is:

1. A method for identifying invalid click(s) by a system including at least one web page on a server side computing device, the at least web page providing a plurality of links associated with a plurality of other web pages associated with a plurality of merchants, the method comprising the steps of:
   generating a first code on the server side computing device, the first code identifying at least one device on a client side;
   sending said first code to said at least one device over a communication network;
   obtaining from the device on the client side, a second code when said at least one user performs a first click on at least one of said links associated with at least one of said other web pages at a first time;
   obtaining from the device on the client side, a third code when said at least one user performs a second click on said at least one link associated with said at least one other web page at a second time; and
   determining, by the server side computing device, whether said second click is invalid by examining a difference between said first time and said second time.

2. The method for identifying invalid click(s) as claimed in claim 1 further comprising the steps of:
   forming a group of a plurality of codes comprising at least said second code and said first code.

3. The method for identifying invalid click(s) as claimed in claim 1 further comprising the steps of:
   forming a group of a plurality of codes comprising at least said third code and said second code.

4. The method for identifying invalid click(s) as claimed in claim 1 further comprising the steps of:
   forming a group of a plurality of codes comprising at least said third code and said first code.

5. The method for identifying invalid click(s) as claimed in claim 1 further comprising the step of:
   sending said second code to said at least one device.

6. The method for identifying invalid click(s) as claimed in claim 1 further comprising the step of:
   sending said third code to said at least one device.

7. The method for identifying invalid click(s) as claimed in claim 1 wherein said first code is a serial number.

8. The method for identifying invalid click(s) as claimed in claim 1 further comprising the step of:
   storing said first code using at least a script executing within a browser interface.

9. The method for identifying invalid click(s) as claimed in claim 1 further comprising the step of:
   storing said first code as a cookie.

10. The method for identifying invalid click(s) as claimed in claim 1 further comprising the step of:
    preventing access to said at least one other web page if said second click on said at least one link associated with said at least one other web page is determined to be invalid.

11. The method for identifying invalid click(s) as claimed in claim 1 wherein the second code and the third code are encoded.

12. The method for identifying invalid click(s) as claimed in claim 1 wherein said code is based on a unique identifier obtained from the device on the client or user side.

* * * * *

UNITED STATES PATENT AND TRADEMARK OFFICE
CERTIFICATE OF CORRECTION

| | | |
|---|---|---|
| PATENT NO. | : 8,671,057 B1 | Page 1 of 1 |
| APPLICATION NO. | : 12/654616 | |
| DATED | : March 11, 2014 | |
| INVENTOR(S) | : Patrick Zuili | |

It is certified that error appears in the above-identified patent and that said Letters Patent is hereby corrected as shown below:

In the Specification:

Column 5, line 7, "80" should be changed to --80--.

In the Claims:

Column 5, line 19, insert the word --one-- after "least".

Column 5, line 27, replace "the device" by --the said at least one device--.

Column 5, line 28, replace "when said at least one user" by --when at least one user--.

Column 5, line 31, replace "the device" by --the said at least one device--.

Column 5, line 39, replace "steps" by --step--.

Column 6, line 4, replace "steps" by --step--.

Column 6, line 8, replace "steps" by --step--.

Signed and Sealed this
Sixteenth Day of September, 2014

Michelle K. Lee
*Deputy Director of the United States Patent and Trademark Office*